United States Patent
Mülhaupt et al.

(10) Patent No.: US 6,942,830 B2
(45) Date of Patent: Sep. 13, 2005

(54) DEVICE AND METHOD FOR THE PRODUCTION OF THREE-DIMENSIONAL OBJECTS

(75) Inventors: Rolf Mülhaupt, Freiburg (DE); Rüdiger Landers, Freiburg (DE); Hendrik John, Hünxe (DE)

(73) Assignee: Envisiontec GmbH, Marl (DE)

( * ) Notice: Subject to any disclaimer, the term of this patent is extended or adjusted under 35 U.S.C. 154(b) by 335 days.

(21) Appl. No.: 10/257,585

(22) PCT Filed: Dec. 1, 2000

(86) PCT No.: PCT/EP00/12102

§ 371 (c)(1),
(2), (4) Date: Oct. 11, 2002

(87) PCT Pub. No.: WO01/78968

PCT Pub. Date: Oct. 25, 2001

(65) Prior Publication Data

US 2003/0090034 A1 May 15, 2003

(30) Foreign Application Priority Data

Apr. 17, 2000 (DE) .......................................... 100 18 987

(51) Int. Cl.[7] .......................... B29C 41/02; B29C 41/22
(52) U.S. Cl. ........................ 264/255; 264/298; 264/308
(58) Field of Search ................................ 264/255, 298, 264/308; 425/375

(56) References Cited

U.S. PATENT DOCUMENTS

| 5,268,994 A | 12/1993 | Keskes | 395/121 |
| 5,653,925 A | 8/1997 | Batchelder | 264/113 |
| 5,894,036 A | 4/1999 | Tylko | 427/279 |

FOREIGN PATENT DOCUMENTS

| DE | 41 05 314 A1 | 8/1991 |
| DE | 41 02 257 A1 | 7/1992 |
| DE | 43 40 108 C2 | 8/1997 |
| DE | 198 38 797 A1 | 3/2000 |
| DE | 100 03 374 C1 | 8/2001 |
| EP | 0 426 363 A2 | 5/1991 |
| FR | 2 254 194 A | 7/1975 |
| FR | 2 583 334 A1 | 12/1986 |
| FR | 2 634 686 A1 | 2/1990 |
| WO | WO 95/11007 A1 | 4/1995 |

*Primary Examiner*—Leo B. Tentoni
(74) *Attorney, Agent, or Firm*—George W. Neuner; Edwards & Angell LLP

(57) ABSTRACT

A device and a process for producing three-dimensional objects is disclosed. The device has a container (1) for a medium (2) and a three-dimensionally positionable dispenser (4) for release of a material (3), the addition of which to the medium (2) leads to the formation of solid structures, into the medium (2). Addition of the material (3) by moving the dispenser in XYZ direction on a platform (8) below the filling height of the first material (2) in the container (1) leads to the formation of three-dimensional objects.

32 Claims, 2 Drawing Sheets

DEVICE AND METHOD FOR THE PRODUCTION OF THREE-DIMENSIONAL OBJECTS

FIELD OF THE INVENTION

The invention relates to a device and a process for the production of three-dimensional objects.

BACKGROUND OF THE INVENTION

It is known to produce three-dimensional objects starting from a CAD model of the object layer by layer. In the known process of stereolithography, monomers are polymerised in the presence of photoinitiators by laser radiation. However, only a limited number of monomer types are suitable as materials. In 3D printing technology, ink-jet technology is used in order to bind powder particles in the particular layer at the points corresponding to the cross-section of the object using adhesives. However, this technology, like stereolithography as well, require after-treatment of the blanks produced.

In addition, supporting constructions are required for forming three-dimensional objects having projections, protuberances and lower cavities, in order to prevent distortion or breaking of the three-dimensional object A different technique for generating three-dimensional models is selective laser sintering. A pulverulent material is thus applied in layers and the particular uppermost powder layer is illuminated using a laser beam at points corresponding to the cross-section of the model. The powder melts or sinters there due to the energy input of the laser. However, the thermal stress of the material is high, so that sensitive polymers are destroyed. Incorporation of biological components, such as for example cells or proteins, is not possible. The generation of hydrogels is also not possible.

A process for forming three-dimensional models is known from French 2 583 334. Therein, a photoinitiator is added to a monomer liquid and the monomer is cured by irradiation. Alternatively, a monomer reacting with a thermal initiator is added to a neutral liquid. However, the accuracy of the formation of the three-dimensional object and the number of useable materials is limited.

Thermoplastic polymers are melted in the technology of Fused Deposition Modelling (FDM). The liquid melt leaves the nozzles as a strand and constructs three-dimensional objects by cooling in air. This process is limited to thermoplastic polymers having a high melt viscosity. The range of the materials used successfully here hitherto is limited to acrylonitrile-butadiene-styrene copolymers and polycaprolactone. The processing temperature thus exceeds 100° C.; this prevents the incorporation of thermally sensitive additives into the 3D object produced.

The object of the invention is the provision of an improved device or an improved process for producing three-dimensional objects.

SUMMARY OF THE INVENTION

The present invention provides a process for producing a three-dimensional object, comprising: provision of a non-gaseous medium (2) in a container (1); positioning of an outlet opening (5) of a three-dimensionally movable dispenser (4) in the medium (2); discharging of a material (3) consisting of one or more component(s) through the dispenser (4) into the medium (2), wherein the material (3) cures after discharge into the medium (2), or leads to the formation of solid structures in contact with the medium (2); and moving the dispenser (4) to the points which correspond to the three-dimensional object, to form a solid three-dimensional structure.

The invention also provides a device for executing the process according to one of the preceding claims, comprising: a container (1) for the medium (2), and a three-dimensionally moveable dispenser (4) for releasing the material (3) into the medium (2), wherein the dispenser (4) has an outlet opening (5), which can be positioned below the filling height of the first material (2) in the container (1).

The process in accord with the present invention preferably includes one or more of the following:

the medium (2) is provided in the container (1) at a predetermined filling height and the outlet opening (5) of the dispenser is positioned below the filling height of the medium (2) in the container (1);

the density of the medium (2) is selected to be approximately the same, insignificantly greater or smaller than the density of the material (3);

microdots are formed with gaps, with coincidence or spirally from the material (3), or one or more microstrands are formed, wherein the microstrand or microstrands are metered individually or coherently, continuously or portion-wise, spirally wound or linearly, with continuous or discontinuous material flow;

liquid or pasty components of the material (3) are used, which is metered as microdrops or as a microjet;

the material (3) is metered as a strand with a core and a shell;

precipitation of the medium (2) and/or of the material (3) is executed, or controlled precipitation for forming skins around substructures of the three-dimensional objects is executed, or the medium (2) contains one or more precipitating agents for precipitating the material (3) and the material (3) is precipitated;

the material (3) contains co-reactive components which react with one another, and/or the first medium (2) contains a co-reactive component which reacts with one or more components of the material (3);

interfacial polymerisation, polycondensation or polyelectrolyte-complex formation is executed;

by removing the material (3) of the core of a core/shell strand or by executing interfacial polymerisation and removing the material (3), which has not reacted during interfacial polymerisation, microcavities or microtubes are formed;

the first medium (2) is dissolved, bound, melted, cured or adhered by metering the material (3) by the material (3) or with it, or in which the material (3) is dissolved, bound, melted, cured or adhered by metering into the medium (2) by the medium (2) or with it;

a liquid, gel-like, thixotropic, pasty, pulverulent, granulated or solid material is used as medium (2), and/or a liquid, gel-like, pasty material is used as material (3);

the medium (2) is selected from the group which contains water, gelatine, an aqueous polyamine solution and a mixture thereof; and the material (3) is selected from the group which contains oligomers and polymers which are liquid at room temperature, melts of oligomers and polymers, reactive oligomers and polymers, monomers, gels, pastes, plastisols, solutions, two-component systems with co-reactive components, dispersions and mixtures thereof;

one or more one-component or two-component silicone rubbers are used for the material (3) as gel, one or more filled oligomers and polymers with one or more organic and inorganic fillers are used as pastes and one or more isocyanate/polyamide systems are used as two-component systems with co-reactive components, or one or more oligourethanes are used as material (3);

inorganic and organic fillers are present in the medium (2) or in the material (3);

one or more monomers are used as medium (2), a fibrous structure and/or a backbone structure is incorporated in a matrix of the monomer or the monomers and the monomer or monomers are then polymerised:

the rheological properties of the medium (2) and of the material (3) are adjusted by using organic and inorganic nanofillers:

biologically active substances are present in the first and/or in the second material (2, 3);

one or more cell types are released at spatially precisely defined points for forming a precisely adjustable three-dimensional structure;

pores for the nutrient supply and for the removal of metabolic products are provided in the three-dimensional structure;

a substance (10) delaying a reaction between the medium (2) or one of its ingredients and the material (3) or one of its ingredients is added to the system consisting of the medium (2) and the material (3);

the substance (10) is added to the material (3); and/or by adding the substance (10), a reaction time (t) between the medium (2) or one of its ingredients and the material (3) or one of its ingredients, is delayed by so much that the material (3) adheres to already cured material (3) after release into the medium (2) before it cures or leads to the formation of solid structures;

The device in accord with the present invention preferably includes one or more of the following:

an outlet opening (5) is designed as a one-dimensional nozzle or as a two-dimensional nozzle panel with singly actuatable, individually heatable and/or valve-controlled nozzles, and the dispenser (4) has one or more containers for the components of the material (3); and/or the medium (2) and/or the material (3) is held at a defined distance or a thermally induced reaction is caused specifically during release, by heating or cooling the container for the components of the material (3), and/or the container (1) and/or the nozzle(s). Further developments of the invention are indicated in the sub-claims.

The present invention also provides use of a biologically or pharmaceutically active substances in a process and/or a device for producing biomedical or biologically active three-dimensional objects, as described above. In accord with the invention, proteins, growth factors and living cells are used as biologically or pharmaceutically active substances, hyaluronic acid, gelatine, collagen, alginic acid and its salts, chitosan and its salts are used as additives or as matrix material.

In the process of the invention, an outlet opening of a three-dimensionally movable dispenser is positioned in a first material (2)—the plot medium—and a second material (3) consisting of one or more components, which leads to the formation of solid structures in contact with the first material (2), is released into the first material (2) to form three-dimensional objects. The first material 2 is designated below as medium or plot medium 2 and the second material 3 as material 3, in order to be able to carry out better differentiation between first (2) and second (3) material.

The action of the medium (2) thus consists firstly in buoyancy compensation and in damping of the movement of the metered, still liquid material (3). The two effects are clearly shown in FIGS. 2 and 3. In FIG. 2, the lack of buoyancy compensation leads to running of the three-dimensional lattice structure of the data record. On the other hand, in FIG. 3, the lattice structure is well formed and the cavity structure between the layers remains fully intact. This technical change "plotting" (dispersing) of a material (3) in a medium (2) having corresponding rheological properties described in more detail below, leads to a considerable expansion of the range of useable materials. Firstly, the material(s) (3) having low viscosity can be constructed to form complicated three-dimensional objects. Secondly, the medium (2) in reactive form may be included in the curing process of the material (3). Thus, chemical reactions may proceed, but also precipitation and complex-formation reactions. The polarity of the material 2 varies depending on the polarity of the material (3) from hydrophilic (for example water) to completely non-polar (for example silicone oil) in order to control the adhesion properties of the layers to one another. A supporting construction may almost always be dispensed with in the process described here for constructing three-dimensional objects. A very important detail of the invention is based on the temperature variability of the process. In conjunction with the large number of possible medium (2)/material (3) combinations, processing conditions can also be realised at room temperature.

Hence, pharmaceuticals or living, human cells may be incorporated into 3D structures.

In a further development of the process, gelatine solution or water is used as medium (2) and silicone rubber as material (3). In a further development of the process, water is used as medium (2) and a wet-curable silicone having acetoxysilane groups as material (3).

In a further development of the process, water, a polyol or a solution of polyfunctional amines is used as medium (2) and a polyurethane (prepolymer) having isocyanate groups as material (3).

In a further development of the process, an aqueous solution of calcium ions and thrombin is used as medium (2), an aqueous solution of fibrinogen as material (3).

In a further development of the process, an aqueous solution of calcium ions and thrombin is used as medium (2), an aqueous solution of fibrinogen with living human cells (for example fibroblasts) as material (3).

In a further development of the process, a solution of a polyelectrolyte is used as medium (2), a solution of multivalent cations, multivalent anions or a polyelectrolyte as material (3).

In a further development of the process, a solution of calcium ions and/or of protonated chitosan and/or thrombin is used as medium (2) and a solution of Na alginate and/or fibrinogen as well as living human or mammalian cells as material (3).

In a further development of the process, an aqueous solution of a protein is used as medium (2) and a salt solution as material (3).

In a further development of the process, a reaction-delaying substance is added to the material and/or the medium. This guarantees that the added material adheres to previously cured or solidified material.

BRIEF DESCRIPTION OF THE DRAWINGS

Further features and advantages can be seen from the following description of embodiments using the attached figures. Of these.

DETAILED DESCRIPTION OF THE INVENTION

Figure 1:
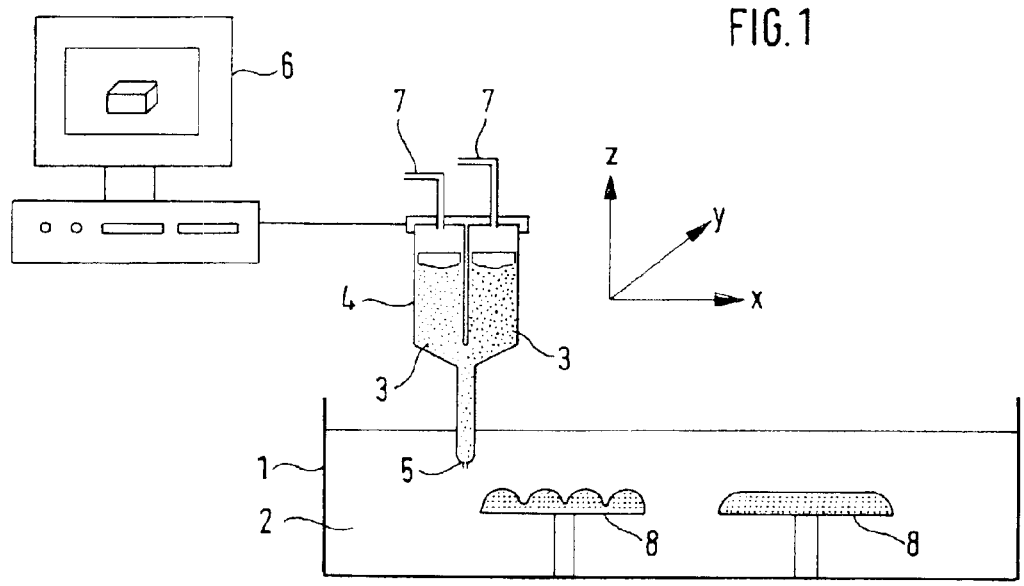
FIG. 1 shows a schematic representation of a device of one embodiment of the invention.

The principle of the invention is illustrated below. The device shown in FIG. 1 has a container 1, a dispenser 4 and a control 6 for the dispenser 4. The device is also designated below as 3D-plotter.

One or more platforms 8, on which the three-dimensional object or objects are formed, are provided in the container 1. A medium 2, which is also designated as plot medium, may be added to the container 1 to a predetermined filling height.

The dispenser 4 is attached to a stand not shown in FIG. 1 and can be moved at least in three axes x, y, z like the milling head of a computer-controlled milling machine. An at least three-axis, computer-NC-controlled milling tool, in which the milling head is replaced by the dispenser, is used by way of example as dispenser 4. The dispenser 4 consists of a nozzle element with material inlet and outlet opening(s) 5. One or more exchangeable cartridges for one or more material component(s) (3) are connected to the material inlet opening(s), wherein the material component(s) 3 are added to the medium 2 to form three-dimensional objects. In order to allow the material component(s) 3 to enter the medium 2 controlled by the nozzle element, compressed air or a further suitable, dried inert gas (nitrogen, argon), depending on metered material 3, may be introduced into the cartridges regulated via the pipes 7. The dispenser 4 can be moved in the three directions above and below the container 1, such that the nozzle element can be positioned within the container 1 with its outlet opening 5 below the filling height of the medium 2.

The outlet opening 5 is designed as a single nozzle or as a nozzle panel. The smallest internal diameters of the outlet opening 5 are about 150 $\mu$m in commercially available nozzles for compressed air-operated dispenser systems.

A different possibility for metering the material 3—without using compressed air, or an inert gas—may be effected by a pump as connection between cartridge and nozzle element, in which the material itself is conveyed by the pump from the cartridge to the nozzle element.

One modification of this possibility envisages integrating the function pump/valve/nozzle in the nozzle element by a mechatronic solution.

The control 6 is designed so that it controls the three-dimensional movement of the dispenser 4, and the release of material component(s) 3 from the dispenser. It is a computer-NC control, which may additionally be coupled to a CAD/CAM and/or image-processing system.

The medium 2, that is the plot medium, is a liquid, thixotropic, gel-like, pasty, solid, pulverulent material present as granules. A co-reactive medium, which enters reactions with the material component(s) 3, for example anionic or cationic polyelectrolytes, polyelectrolyte salt mixtures or substances having co-reactive functional groups, may be used as plot medium. Alternatively, precipitation agents for the material component(s) 3 are present in the plot medium.

The material components 3, which are released from the dispenser into the plot medium 2, are liquid, gel-like, pasty materials. Examples of the material components 3 are oligomers and polymers which are liquid at room temperature, melts of oligomers and polymers ("hot melts"), reactive oligomers and polymers, monomers, gels, for example one-component or two-component silicon rubbers, pastes, for example filled oligomers and polymers with organic and inorganic fillers, plastisols, that is polymer powders dispersed in plasticisers, solutions, two-component systems with co-reactive components, for example isocyanates/alcohols and dispersions.

The medium 2 and the material component(s) 3 may be selected so that by metering the material component(s) 3 into the medium 2, the latter is dissolved, bound, melted, cured or adhered by the material component(s) 3 or with it/them. Conversely, the material component(s) 3 may be dissolved, bound, melted, cured or adhered by the medium 2 or with it.

A medium 2 may be selected having a density which is the same or approximately the same or somewhat smaller/larger than that of the material component(s) 3, in order to compensate bending of the structure in the case of projecting parts of the structure to be formed. Alternatively, due to a thixotropic, gel-like, pasty or pulverulent consistency of the medium 2, bending and positional changes of the structure to be formed may be prevented in the plot medium by the medium 2 itself.

In each case, the addition of material component(s) 3 into the medium 2 leads directly to the formation of three-dimensional solid structures. No additional auxiliaries, such as for example irradiation, are necessary.

First Embodiment

The description of a first embodiment of the invention follows.

A pneumatically operated dispenser 4 of the principle described above is provided with a cartridge and has as outlet opening 5 a needle having an internal diameter of about 250 $\mu$m. A metering valve is connected to the pipes 7 via hoses to regulate the pressure within the cartridges. This reduces the compressed air introduced from 7 bar to the necessary cartridge pressure depending on the material (3). In addition, the reducing valve may be completely closed by the control 6, in order to start or to interrupt the metering process.

In operation, the container 1 is filled with water. A silicone resin, which can be cured using water, is placed into the cartridge of the dispenser 4. Acetoxysilanes, which effect acid-catalysed silanol polycondensation during hydrolysis in the presence of water, are present in the silicone.

The free needle end is positioned above the platform 8 at a starting position within predetermined dimensions of the three-dimensional object to be formed, which are preset by a computer model of the object, via the control 6. The silicone is then applied to the platform 8 to form the first layer of the three-dimensional object corresponding to the predetermined dimensions at an operating pressure of about 0.8 bar and at room temperature. The needle of the dispenser is moved parallel to the platform by the control 6 such that a moving rate in XY direction of about 11 to 12 m/h is set. The silicone thus cures directly after adding to the water.

The addition of material 3 onto the platform 8 into the medium 2 takes place either portion-wise at individual points to form microdots (micro-drops) or continuously to form microstrands for gel-like or pasty materials 3 and as a microjet for liquid materials 3.

After completing the first layer of the three-dimensional object, the dispenser needle is positioned in the Z direction shown in FIG. 1 above the first layer by changing the position of the dispenser 4. The second layer of the three-dimensional object is formed by a controlled movement of the dispenser head and controlled addition of silicone. These steps are repeated so that the three-dimensional object is produced by successive formation of layers. When metering microstrands, the strand must not necessarily be separated between the individual layers. This facilitates the construction of the 3D object from a single microstrand.

For example, backbone-like or scaffolding three-dimensional objects may be produced in this manner, by forming strands running parallel to one another in a first direction within the first layer. A gap may thus be present between the strands of one plane. Strands parallel to one another in a second direction are then formed during the formation of the second layer. A backbone of layers of strands is then constructed by repeating these steps.

Microdots may be formed next to one another, on one another or with gaps. Spiral deposition of microdots or microstrands leads to the formation of tubes, the size of which lies in the millimetre to centimetre range, having an internal diameter of about at least 100 $\mu$m.

If three-dimensional objects having large projections or cuts are formed, there may be distortion of the object in water due to gravity. To avoid this problem, the thixotropy of the silicone is adapted, for example by liquefying the silicone during the production process by stirring, shaking or vibrations or by control of the silicone thixotropy by means of organic and inorganic nanofillers. Alternatively, instead of water, a medium having a density the same or similar, that is somewhat smaller/larger than that of the silicone, is used. Consequently, forces which act on projections of the three-dimensional object due to gravity, are compensated by the buoyancy. A further possibility for preventing distortions of the three-dimensional object, is the use of thixtropic or thermoreversible gels instead of water, such as for example industrial gelatine, in which the material flow of the metered material is then negligible.

In a modification of the process described above, the silicone is replaced during plotting by other resins, for example by exchanging the cartridges. This produces the possibility of changing material properties and colours within the three-dimensional object. For example, backbones may be formed from a material in this manner, into which denser layers of a different material are incorporated.

Second Embodiment

In a second embodiment, a dispenser 4 is used which has a heatable needle as outlet opening 5. A plastisol, that is a polymer powder dispersed in one or more plasticisers, is provided as material in a cartridge on the dispenser 4. Water is provided in the container 1. The plastisol becomes gelled within the heated needle immediately before release into the water. The plastisol is cooled in the water and thus solidified. In addition, the plastisol may also be gelled later in an oven in order to improve the structural properties of the three-dimensional object. PU prepolymers with isocyanate and hydroxyl groups are a further example. They are situated in the cartridge 4 at room temperature or slightly cooled and are gelled by heating in the heated needle of the outlet opening 5. Other chemical reactions are also conceivable here, which lead to solidification/gelling and can be started by a short thermal impulse.

Third Embodiment

In the third embodiment, a co-reactive system comprising several materials is used. The dispenser 4 is provided with a cartridge and with a needle at the outlet opening 5. A polyurethane having functional isocyanate groups is initially placed in the cartridge. The container 1 is filled with water or an aqueous amine solution. During the addition of the polyurethane there is a reaction with the water or with the aqueous amine solution and curing of the co-reactive system.

In a modification of this embodiment, the dispenser 4 is provided with two cartridges. A reactive resin is present in the one cartridge and a component for curing the reactive resin is present in the other cartridge. When using mixing nozzles, the substances initially placed in the cartridges are mixed with exclusion of air before or during addition into a plot medium, such as for example water. The reactive resin and the component for curing react with one another with formation of solid three-dimensional structures.

Alternatively, co-reactive systems which lead to the formation of solid three-dimensional structures by boundary polycondensation reactions or by polyelectrolyte-complex formation, may be used in the manner shown above.

Fourth Embodiment

In a further embodiment, a medium 2, which reacts with the material 3 such that after removing unreacted material components 3, microtubes, or microcavities are formed in the centre of the strands, is placed in the container 1. These cavities in turn may construct a 3D structure. Boundary polymerisations (diacid chlorides as material 3, diamines as medium 2) are examples of this. Further variants are polyelectrolyte complexes (for example Na alginate solutions as material 3 and a solution of protonated chitosan as medium 2). Microtube bundles can be produced by parallel alignment of the metered strands.

Fifth Embodiment

In one embodiment, organic and inorganic fillers are present in the materials used in order to produce three-dimensional objects consisting of multiphase polymers and composite materials. For example a filled heat-exchangeable plastic or a hot melt of a nanocomposite material may be added to water as plot medium from the dispenser 4 by a heated needle.

In order to achieve higher resolution, better tolerances and more rapid formation processes, alternatively microdispensers with separately actuatable multiple nozzles may also be used.

Sixth Embodiment

In a further development of the first embodiment, a pharmaceutically active material is present in the material 3 released by the dispenser 4 (for example fibronectin or growth factors). Since high temperatures are not necessarily required during the process, the process may take place, for example at room temperature. Then pharmaceutically active materials are not decomposed or deactivated and are present in their active form in the three-dimensional object. The object may therefore be used, for example as an implant in order to promote cell growth around the implant in the body. Direct processing of a suspension of living human cells is also possible here. Lattice structures as described in Embodiment 1, thus guarantee the subsequent supply of cells with nutrient medium (in vitro) or blood (in vitro). The arrangement shown in FIG. 1 may be sterilised for this purpose (UV light, ethylene oxide, locating the process in a clean room). Gelatine solution, collagen solutions, Na alginate solutions, albumen solutions are thus suitable as excipient material 3 for the living cells.

Seventh Embodiment

In a seventh embodiment, the outlet opening 5 of the dispenser is designed as a two-dimensional nozzle panel with in each case singly actuatable, individually heatable nozzles. This simplifies the layer-wise formation of a three-dimensional object in that the dispenser is moved only in x direction and not in y direction when using a nozzle series to form a layer. Furthermore, the use of a nozzle panel facilitates it being possible to form an object by moving the dispenser only in the z direction.

Eighth Embodiment

In order to keep medium 2 and/or material 3 at a defined distance or to cause a thermally induced reaction specifically during the plotting process, heating or cooling of the cartridge and pipe for material 3, of the bath/building chamber may be carried out using plot medium 2 or the nozzle(s) separately or in combination.

Oligourethanes are preferably used as material in the process of the invention, because the resulting microstructures, and also the compositions of the polyurethanes may be varied in simple manner in order to control mechanical properties of the resulting three-dimensional object, which may thus be formed, for example like rubber or very rigidly. Oligourethanes may be used as co-reactive system, as described in the third embodiment, or as hot melt analogously to the second embodiment.

The invention facilitates the formation of a plurality of three-dimensional structures with different material combinations. By using one or more monomers as plot medium, for example a fibrous structure and/or a backbone structure of a further material may be incorporated in a matrix of the monomer or the monomers and then the monomer or monomers are polymerised.

In the embodiments described above, maximum resolution of a microdot or microstrand deposition may currently be achieved using commercially available dispensers of about 100 to 200 $\mu$m, determined by the internal diameter of the nozzle, the operating pressure, the moving rate of the nozzle(s) and in particular by the theological properties of the material used.

Microdot metering may take place with gaps, with coincidence or spirally. Microstrands may be wound spirally using a continuous material flow, as individual strands, as continuous strands, or metered adapted to the free form. In addition, liquid material components may be added to the plot medium as a microjet. A further possibility of metering consists in so called coextrusion, that is in metering a strand having a core and a shell (coreishell strand).

Rheological properties (flow properties) may be influenced if adequate material flow and preferably high thixotropy, that is the rapid rise of the viscosity with decreasing shear rates, is to be achieved. Controlled flow after addition of the material is necessary in order to obtain smooth surfaces without causing the collapse or distortion of the 3D structure. For example, self-regulating or segmented oligomers may be used in order to control the rheology. For larger three-dimensional objects, larger flat nozzles or multiple nozzles may be used, and the flow may be compensated after the addition, for example by appropriate selection of plot medium, in order to obtain smooth surfaces. In order to control thixotropy, the use of self-regulating nanofillers facilitates the formation of network structures which react to shear forces.

The process of the invention does not require thermal or chemical after-treatment of the three-dimensional object formed. When selecting appropriate materials, high temperatures do not also have to be set during the process. This facilitates the use of temperature-sensitive, biologically or pharmaceutically active materials either as additive, such as for example proteins, growth factors and living cells, but also as matrix materials, such as for example hyaluronic acid, gelatine, collagen, alginic acid and its salts, chitosan and its salts. Hence, for the first time biocompatible and biodegradable excipients, which have a defined, freely selectable form and contain thermally and toxicologically highly sensitive materials or structures, may be produced in one step. Excipients of this type have considerable importance for the field of tissue engineering. In particular the novel possibility of plotting one or more cell types (by means of several containers 4 and several nozzles 5) at spatially precisely defined points in a precisely adjustable three-dimensional structure, which also permits pores for nutrient supply and removal of metabolic products, is important. Organs of mammals consist of a supporting tissue (for example collagen) and greatly differing types of cells, which detect very different functions (for example liver cells). Simultaneous in-vitro culture of different cell types creates considerable difficulties, due to different growth rates and growth conditions. Their simultaneous structuring to form organs is hitherto only successful for single organs (for example the skin). On the other hand, such a complex structure may be realised by means of the invention presented here.

An aqueous solution of calcium ions, thrombin and gelatine (to increase viscosity) may serve here as an example of medium 2; material 3 is then an aqueous solution of human fibrinogen, sodium alginate and living cells.

Two mechanisms then lead to gelling: a) complex formation of the alginate to form insoluble calcium alginate and b) gelling of the fibrinogen to form fibrin.

Here too, both the processability of material 3 may be adjusted, and also an improvement in mechanical properties of the finished three-dimensional object may be achieved by adding inorganic or organic fillers.

The addition of pulverulent hydroxylapatite (main mineral of mammal bone) may serve here as an example. Hence, a three-dimensional object, which may serve to remove bone defects, may be produced in conjunction with living bone cells.

Likewise, further applications of the invention may lie in the field of release of active ingredients. The invention facilitates, for example the production of active ingredient excipients adapted precisely to the patient; this may serve, for example for the slow release of an active ingredient—the active ingredient is thus situated in the material 3 itself and not on the surface—in the brain, by placing a three-dimensional object adapted to the brain cortex and the active ingredient is released directly in the brain and does not have to overcome the blood-brain barrier. This is important for the post-operative treatment of brain tumour patients.

The invention also leads to the advantage that three-dimensional objects can be produced individually both for medical applications and for the production of prototypes in industry and in science.

In addition, the smallest structures may be formed, since the structural resolution achieved lies in the range from 150 dpi (170 $\mu$m) and can be varied in simple manner, as a function of the internal diameter of the nozzle(s) used, the operating pressure during addition, the addition rate of the material 3, the moving rate of the nozzle(s), the rheology of plot medium and material and the remaining material properties.

Furthermore, when using multiple nozzles, which are arranged as a panel or matrix, a resolution of 600 dpi or more may be achieved. The multiple nozzles are thus constructed as a micromechanical system, in which the individual nozzles are valve-controlled (the nozzles or outlet openings are arranged like a panel or matrix on a common nozzle plate) and represent in each case an outlet opening to a common nozzle chamber at its defined panel or matrix position, which is supplied with the material 3 under regulated pressure, comparable with the "common rail" principle from diesel injection technology).

The formation of three-dimensional objects in liquid media, the densities of which are the same or similar, that is somewhat smaller/larger than the density of the added material and thus serve for buoyancy compensation of the material 3, or addition to thixotropic or gel-like media, in order to reduce the material flow of the metered material 3 in the medium 2 to a minimum, makes it possible to have the projections, undercuts and/or cavities when forming is the three-dimensional objects without operating supporting structures.

A further advantage of the process of the invention consists in it being possible to use a plurality of reactive and non-reactive materials. For example, co-reactive systems and hot melts having a viscosity which is lower compared to the conventional polymer melts, may be used.

The device of the invention and the process of the invention are suitable not only for biomedical application, but also for the "desktop" construction of three-dimensional objects, which is suitable for an office, and for rapid prototyping.

Figure 4:
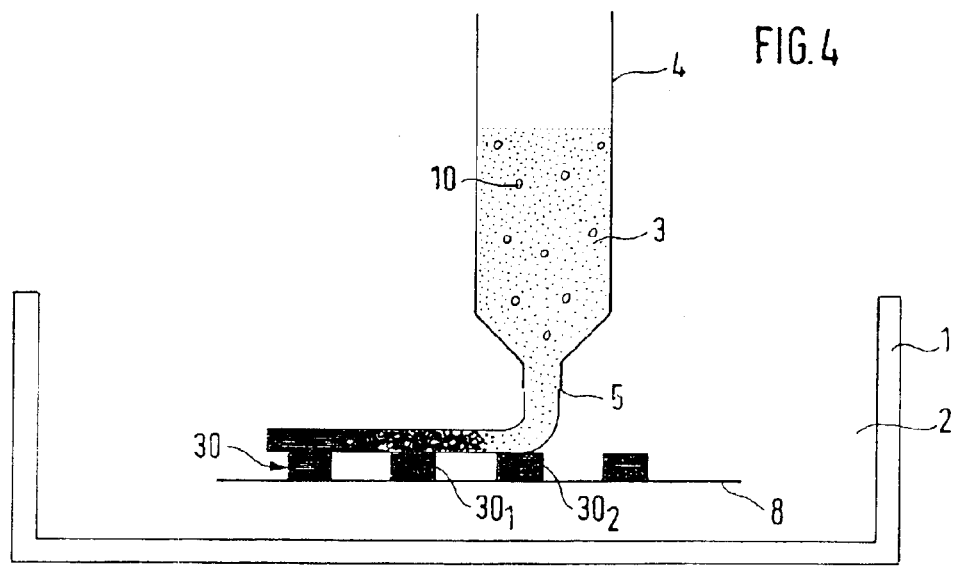
FIG. 4 shows a schematic cross-sectional view of a further embodiment of the invention.
Figure 2:
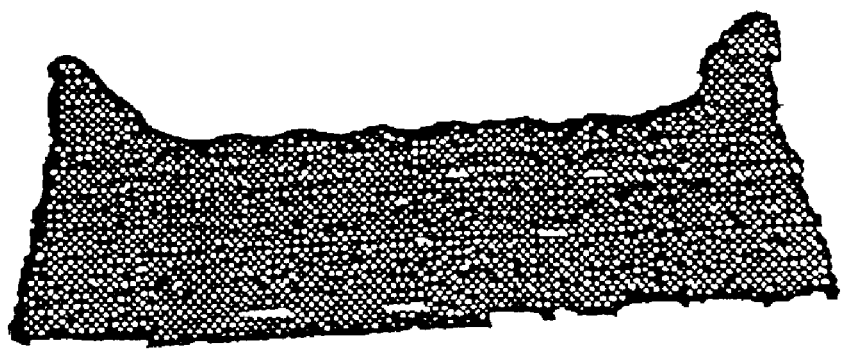
FIG. 2 shows a cross-section through a plotted 3D object; plot medium (2)=air, material (3)=PU prepolymer.
Figure 3:
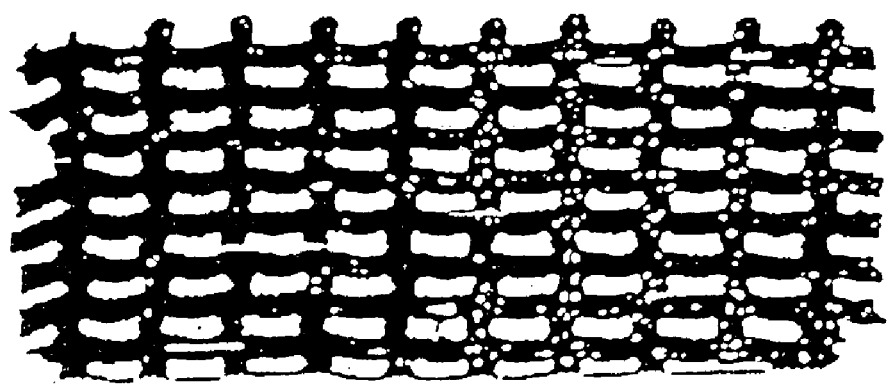
FIG. 3 shows a cross-section through a plotted 3D object; plot medium (2)=water, material (3)=PU prepolymer.

As is shown in FIG. 4, in a further preferred embodiment of the invention, a substance (10), which delays the reaction between the medium (2) and the material (3) or their reactive components, is added either to the medium (2) or preferably to the material (3). This substance 10 ensures that good adhesion of the material added via the dispenser 4 to already cured structures 30 of material 3, which lie for example in a preceding plot plane, is achieved. The reaction-delaying substance 10 is selected so that the reaction between the reaction partners 2 and 3 or their reactive ingredients, which takes place mainly initially at the boundary between already cured material 30 and added material 3, is delayed by a time span t (delay time), which is sufficient that the added material 3 adheres to the already cured or solidified structures 30 before it reacts with the medium 2. In the exemplary embodiment shown in FIG. 4, the delay time t is preset by the time which the material 3 requires in order to flow from one section $30_1$ to a section $30_2$ of an already solidified structure. The delay time lies between about 1/100 s and about a few seconds, depending on the materials used and metering rates. Different substances, depending on the co-reactive system of medium 2 and material 3 used, are suitable as reaction-delaying substances. The reaction-delaying substance 10 effects deactivation of the reacting molecules either of material 3 or of medium 2, in particular those of medium 2, which penetrate into material 3 while it is added. After some time, the molecules of the reaction-delaying substance 10 itself become inactive, so that their action is no longer sufficient to prevent the reaction between the material 3 and the medium 2.

Examples of the reaction-delaying substances are the following: for anionic polyelectrolytes, for example alginic acid, as reactive component in the material 3 and substances having multivalent cations, for example calcium, as reactive component of medium 2, suitable reaction-delaying substances are, for example EDTA, acetylsalicylic acid or heparin, wherein the multivalent cations are masked, or sulphate ions, wherein the multivalent cations are precipitated. For cationic polyelectrolytes, for example chitosan, as reactive component in the material 3 and substances having multivalent anions as reactive component of medium 2, suitable reaction-delaying substances are for example Ca, Ba, or Sr ions, wherein the multivalent anions are precipitated, or short-chain cationic polyelectrolytes, wherein the multivalent anions are masked.

For fibrinogen as reactive component of material 3 and thrombin and/or calcium as reactive component of medium 2, anti-coagulants, for example heparin, are suitable as reaction-delaying substance 10, wherein calcium ions are deactivated and/or thrombin is inhibited.

For a monomer having a free-radical initiator, for example BPO, as reactive component of material 3 and a coinitiator, for example amine, as reactive component of medium 2, a free-radical absorber, such as a sterically hindered phenol, which destroys resulting free-radicals, is suitable as reaction-delaying substance 10.

It is understood that the above list is only by way of example and that each reaction-delaying substance may be used which leads to a defined reaction delay time for a special co-reactive system of material 3 and medium 2. The embodiment described can be used in association with all afore-mentioned embodiments.

In a further preferred embodiment, reaction-delaying substances are added as substances which protect the reaction component in material 3 or medium 2 from undesirable reactions or prevent such reactions. For example, vitamin E (tocopherol) may be used as reactiondelaying substance or inhibitor for the case that a thermoplastically processable meterable polymer is used as material 3 in order to protect it from oxidation.

The process described according to all afore-mentioned embodiments is not restricted to the fact that pure materials are used as material 3 or as medium 2. Mixtures of materials may also be used. For example, blends of polyelectrolytes, fibrinogen, fibrin and other materials mentioned are possible as mixtures for the material 3.

In a further embodiment, it is possible to use a material, which contains a material dissolved therein, which precipitates during transfer into the medium 2 due to a change in the dissolving property and forms a solid structure, as material 3. This embodiment can be used, for example for plotting bone cements based on polymethylmethacrylates and calcium phosphates for delaying curing. Bone cements are known, which are based on polymerisation of polymethylmethacrylates with phosphates, for example hydroxylapatite, as filler. Solid polymethylmethacrylate is dissolved in methylmethacrylate, which is a monomer. The resulting highly viscous solution is then mixed with the mineral phosphate component. During 3D plotting, a two-component system of initiator and co-initiator is used. The PMMA/MMA/apatite paste forms the plot material 3. The initiator is added to the latter, wherein polymerisation is not yet started by the latter. The co-initiator is added to the plot medium 2. Polymerisation starts by contact of the PMMA/MMA/apatite paste with the plot medium, which contains the co-initiator. The curing time is thus selected to be as short as possible. For example, benzene peroxide is used as initiator and an amine as co-initiator.

We claim:

1. A process for producing a three-dimensional object, the process comprising:
   providing a container having therein a non-gaseous medium;
   providing a three-dimensionally movable dispenser having an outlet opening to dispense a material comprising one or more components;
   positioning the outlet opening of the three-dimensionally movable dispenser in the medium;
   discharging of the material through the outlet of the dispenser into the medium;

allowing the material to form a solid structure; and moving the dispenser to the points within the medium which correspond to a structure of a three-dimensional object and repeating the steps of discharging the material and allowing the material form a solid structure at each point, thereby forming a solid three-dimensional structure;

wherein the material, after being discharged into the medium, forms a solid structure due to the contact with the medium without irradiation.

2. The process according to claim 1, wherein the medium is provided in the container at a predetermined filling height and the outlet opening of the dispenser is positioned below the filling height of the medium in the container.

3. The process according to claim 1, further comprising selecting the medium to have a density that is approximately the same as the density of the material.

4. The process according to claim 1, further comprising forming microdots with gaps with coincidence or spirally from the material, or forming one or more microstrands, wherein the one or more microstrands are metered individually or coherently, continuously or portion-wise, spirally wound or linearly, with continuous or discontinuous material flow.

5. The process according to claim 1, wherein the material comprises liquid or pasty components, and the material is discharged in a metered amount as a microdrop or as a microjet.

6. The process according to claim 1, wherein material is discharged in a metered amount as a strand with a core and a shell.

7. The process according to claim 1, further comprising at least one of the following steps:

precipitation of the medium and/or of the material;

controlled precipitation for forming skins around substructures of the three-dimensional objects; or wherein the medium comprises one or more precipitating agents for precipitating the material and precipitation of the material occurs.

8. The process according to claim 1, wherein the material comprises co-reactive components which react with one another, and/or the medium comprises a co-reactive component which reacts with one or more components of the material.

9. The process according to claim 8, wherein interfacial polymerization, polycondensation, or polyelectrolyte-complex formation occurs.

10. The process according to claim 1, further comprising forming microcavities or microtubes.

11. The process according to claim 1, wherein material is discharged in a metered amount as a strand with a core and a shell, the process further comprising forming microcavities or microtubes by removing the material of the core.

12. The process according to claim 1, wherein the material comprises co-reactive components which react with one another, and/or the medium comprises a co-reactive component which reacts with one or more components of the material, the process further comprising permitting interfacial polymerization and forming microcavities or microtubes by removing the material which has not reacted during interfacial polymerisation.

13. The process according to claim 1, wherein the medium is dissolved, bound, melted, cured or adhered with the material by discharging the material into the medium, or wherein the material is dissolved, bound, melted, cured or adhered with the medium by discharging the material into the medium.

14. The process according to claim 1, wherein the medium comprises a liquid, gelatinous, thixotropic, pasty, pulverulent, granulated or solid substance.

15. The process according to claim 1, wherein the material comprises a liquid, gelatinous or pasty substance.

16. The process according to claim 1, wherein the medium is selected from the group consisting of water, gelatin, an aqueous polyamine solution and a mixture thereof, and wherein the material is selected from the group consisting of oligomers and polymers which are liquid at room temperature, melts of oligomers and polymers, reactive oligomers and polymers, monomers, gels, pastes, plastisols, solutions, two-component systems with co-reactive components, dispersions and mixtures thereof.

17. The process according to claim 16, wherein the material is selected from the group consisting of (i) a gel comprising one or more one-component or two-component silicone rubbers, (ii) a paste comprising one or more filled oligomers and polymers with one or more organic and inorganic fillers and (iii) a two-component system with co-reactive components comprising one or more isocyanate/polyamide systems.

18. The process according to claim 1, at least one of the medium and the material comprise inorganic and organic fillers.

19. The process according to claim 1, wherein the medium comprises one or more monomers and the process further comprises incorporating a fibrous structure and/or a backbone structure in a matrix of one or more monomers and polymerizing the one or more monomers.

20. The process according to claim 1, further comprising adjusting the rheological properties of the medium and of the material by using organic and inorganic nanofillers.

21. The process according to claim 1, wherein one of the medium and the material comprises a biologically active substance.

22. The process according to claim 1, the process further comprising releasing one or more cell types at spatially precisely defined points in the medium, thereby forming a precisely adjustable three-dimensional structure.

23. The process according to claim 22, further comprising providing pores in the three-dimensional structure for the nutrient supply and for the removal of metabolic products.

24. The process according to claim 1, further comprising providing a substance that delays a reaction between the medium or one of its components and the material or one of its components.

25. The process according to claim 24, wherein the substance is added to the material.

26. The process according to claim 24, further comprising delaying a reaction time (t) between the medium or one of its components and the material or one of its components so that, after discharging the material into the medium, the material adheres to already cured material before it cures or forms a solid structures.

27. The process according to claim 26, wherein the substance is added to the material.

28. A device for producing a three-dimensional object, said device comprising:

a container containing a medium arranged in the container to a filling height; and a three-dimensionally moveable dispenser comprising one or plural cartridges for one or plural material components, the dispenser having an outlet opening for releasing the material into the medium through the outlet opening;

the device being structured and arranged to position the outlet opening below the filling height of the medium in the container;

wherein, after the material is released into the medium, a solid structure is formed due to the contact with the medium without irradiation.

29. The device according to claim 28, further comprising a one-dimensional nozzle or a two-dimensional nozzle panel, which comprises the outlet opening, the nozzle being singly actuatable, individually heatable and/or valve-controlled, and wherein the dispenser comprises one or more second containers for holding separable components of the material.

30. The device according to claim 29, being structured and arranged to hold the medium and/or the material to induce a thermally induced reaction during discharge of the material into the medium, the device comprising means for heating or cooling the second container for the components of the material, and/or the container and/or the nozzle.

31. The process according to claim 1, wherein at least one of the material and medium comprises a biologically or pharmaceutically active substance, thereby producing a biomedical or biologically active three-dimensional object.

32. The process according to claim 31, wherein the biologically or pharmaceutically active substance comprises a substance selected from the group consisting of proteins, growth factors and living cells and at least one of the material and medium further comprises an additive selected from hyaluronic acid, gelatin, collagen, alginic acid and its salts, and chitosan and its salts.

* * * * *